US012684214B2

(12) United States Patent (10) Patent No.: US 12,684,214 B2
Hsu et al. (45) Date of Patent: Jul. 14, 2026

(54) OPTICAL SYSTEM

(71) Applicant: Actutek Corporation, Taoyuan City
(TW)

(72) Inventors: Chan-Jung Hsu, Taoyuan City (TW);
Chen-Hsin Huang, Taoyuan City
(TW); Chen-Hung Chao, Taoyuan City
(TW); Yi-Ho Chen, Taoyuan City
(TW); Kun-Shih Lin, Taoyuan City
(TW); Shou-Jen Liu, Taoyuan City
(TW)

(73) Assignee: Actutek Corporation, Taoyuan City
(TW)

( * ) Notice: Subject to any disclaimer, the term of this
patent is extended or adjusted under 35
U.S.C. 154(b) by 480 days.

(21) Appl. No.: 18/056,661

(22) Filed: Nov. 17, 2022

(65) Prior Publication Data

US 2023/0269451 A1      Aug. 24, 2023

Related U.S. Application Data

(60) Provisional application No. 63/312,987, filed on Feb.
23, 2022.

(30) Foreign Application Priority Data

Sep. 30, 2022     (CN) .......................... 202211209326.6

(51) Int. Cl.
*H04N 23/54* (2023.01)
*G02B 7/08* (2021.01)
(Continued)

(52) U.S. Cl.
CPC ............... *H04N 23/54* (2023.01); *G02B 7/08*
(2013.01); *G03B 9/10* (2013.01); *H04N 23/55*
(2023.01); *H04N 23/57* (2023.01); *G02B*
*5/005* (2013.01)

(58) Field of Classification Search
CPC ........ H04N 23/54; H04N 23/55; H04N 23/57;
G02B 7/08; G02B 7/021; G03B 9/06;
G03B 9/10
(Continued)

(56) References Cited

U.S. PATENT DOCUMENTS 5,997,187 A * 12/1999 Hamasaki ................ G03B 9/24
                                                      396/458
2012/0120508 A1* 5/2012 Gutierrez ................ G03B 3/10
                                                      359/823
(Continued)

FOREIGN PATENT DOCUMENTS

JP      2011039181 A * 2/2011

*Primary Examiner* — William R Alexander
*Assistant Examiner* — Alaina Marie Swanson
(74) *Attorney, Agent, or Firm* — MUNCY, GEISSLER,
OLDS & LOWE, P.C.

(57) ABSTRACT

An optical system is provided and includes a first optical
element driving mechanism, which includes a first fixed
assembly, a first movable assembly, and a first driving
assembly. The first movable assembly is configured to be
connected to at least two first optical element, and the first
movable assembly is movable relative to the first fixed
assembly. The first movable assembly includes a first mov-
able element. The first drive assembly is configured to drive
the first movable assembly to move relative to the first fixed
assembly. The first fixed assembly and the first movable
assembly are arranged along a main axis, the first driving
assembly is configured to drive the first movable element to
move around the main axis, and a portion of the first driving
assembly is disposed on the first movable element.

21 Claims, 12 Drawing Sheets

(51) Int. Cl.
    *G03B 9/10*         (2021.01)
    *H04N 23/55*      (2023.01)
    *H04N 23/57*      (2023.01)
    *G02B 5/00*       (2006.01)

(58) Field of Classification Search
    USPC .......................... 359/233, 234, 811; 396/510
    See application file for complete search history.

(56)            References Cited

U.S. PATENT DOCUMENTS

2017/0118411 A1*   4/2017   Morinaga ............ G02B 27/646
2020/0064711 A1*   2/2020   Kim ......................... G03B 9/06

\* cited by examiner

OPTICAL SYSTEM

CROSS REFERENCE TO RELATED APPLICATIONS

This application claims the benefit of U.S. Provisional Application No. 63/312,987, filed on Feb. 23, 2022, and China Patent Application No. 202211209326.6, filed on Sep. 30, 2022, the entirety of which are incorporated by reference herein.

BACKGROUND OF THE DISCLOSURE

Field of the Disclosure

The present disclosure relates to an optical system, and in particular it relates to an optical system having an aperture structure.

Description of the Related Art

As technology has developed, many of today's electronic devices (such as smartphones) have a camera and video functionality. Using the camera modules disposed in electronic devices, users can use their electronic devices to capture photographs and record videos.

Today's design for electronic devices continues to follow the trend of miniaturization, meaning that the various components of the camera module and its structure must also be continuously reduced, so as to achieve miniaturization. In general, a driving mechanism in the camera module has a camera lens holder configured to hold a camera lens, and the driving mechanism can have the functions of auto focusing or optical image stabilization. In addition, the camera module can also be equipped with an aperture mechanism to adjust the amount of light. However, although the existing driving mechanism can achieve the aforementioned functions of photographing and video recording, they still cannot meet all of the users' needs.

Therefore, how to design a camera module that can perform auto-focus, optical anti-shake, adjust the amount of light and achieve miniaturization at the same time are topics nowadays that need to be discussed and solved.

BRIEF SUMMARY OF THE DISCLOSURE

Accordingly, one objective of the present disclosure is to provide an optical system to solve the above problems.

According to some embodiments of the disclosure, an optical system is provided and includes a first optical element driving mechanism, which includes a first fixed assembly, a first movable assembly, and a first driving assembly. The first movable assembly is configured to be connected to at least two first optical elements, and the first movable assembly is movable relative to the first fixed assembly. The first movable assembly includes a first movable element. The first driving assembly is configured to drive the first movable assembly to move relative to the first fixed assembly. The first fixed assembly and the first movable assembly are arranged along a main axis, the first driving assembly is configured to drive the first movable element to move around the main axis, and a portion of the first driving assembly is disposed on the first movable element.

According to some embodiments, the optical system further includes a second optical element driving mechanism. The first optical element driving mechanism is disposed on the second optical element driving mechanism. The first fixed assembly includes an outer shielding member, a first frame and a first base. The first frame is affixed to the first base. The outer shielding member is affixed to the first frame. The first frame is located between the outer shielding member and the first base.

According to some embodiments, the first movable element is disposed in the first frame. The first movable element is rotatable around the main axis relative to the first frame. The first optical element driving mechanism further includes a first rolling assembly disposed between the first movable element and the first base. The first rolling assembly includes at least three first rolling elements. The first movable element rotates around the main axis relative to the first base and the first frame by the first rolling elements. The first frame has at least three accommodating grooves. The first movable element has at least three grooves, respectively corresponding to the at least three accommodating grooves. The first base has at least three grooves, respectively corresponding to the at least three grooves of the first movable element. The first rolling element is disposed in the corresponding accommodating groove, the corresponding groove of the first base, and the corresponding groove of the first movable element.

According to some embodiments, when viewed along the main axis, each of the accommodating grooves has two side surfaces and a connecting surface. The connecting surface is connected between the two side surfaces. The connecting surface is neither parallel nor perpendicular to the two side surfaces. The minimum distance between the two side surfaces is less than the diameter of the first rolling element. One of the three first rolling elements is configured to be in contact with the two side surfaces of the corresponding accommodating groove instead of being in contact with the corresponding connecting surface. The other two of the three first rolling elements are configured to be in contact with the connecting surface of the corresponding accommodating groove.

According to some embodiments, the at least two first optical elements are movably connected to the first movable element. When the first movable element rotates around the main axis, the at least two first optical elements move relative to the first fixed assembly and the first movable assembly, so as to adjust the amount of external light entering the first optical element driving mechanism. When viewed along the main axis, the outer shielding member has a ring structure and a first outer opening.

According to some embodiments, there are at least two first guiding grooves formed on the outer shielding member. Each of a part of the at least two first optical elements has a first upper protruding pillar and a first lower protruding pillar. Each of the other part of the at least two first optical elements has a second upper protruding pillar and a second lower protruding pillar. When viewed along the main axis, the first upper protruding pillar does not overlap the first lower protruding pillar. When viewed along the main axis, the second upper protruding pillar does not overlap the second lower protruding pillar.

According to some embodiments, the first lower protruding pillar and the second lower protruding pillar are configured to be inserted into the first movable element. Each of the at least two first guiding grooves is configured to accommodate the corresponding first upper protruding pillar and the second upper protruding pillar. When the first movable element rotates around the main axis, a part of the at least two first optical elements rotates around the first lower protruding pillar, and the first upper protruding pillar is configured to move along the corresponding first guiding groove. When the first movable element rotates around the main axis, the other part of the at least two first optical elements rotates around the second lower protruding pillar, and the second upper protruding pillar is configured to move along the corresponding first guiding groove.

According to some embodiments, each of the at least two first optical elements has a plate-shaped structure. The main axis is perpendicular to the extending direction of the plate-shaped structure. When viewed in a direction that is perpendicular to the main axis, the distance between a part of the at least two first optical elements and the first base in the main axis is different from the distance between the other part of the at least two first optical elements and the first base in the main axis. When viewed in a direction that is perpendicular to the main axis, the length of the first upper protruding pillar is different from the length of the second upper protruding pillar.

According to some embodiments, when viewed in a direction that is perpendicular to the main axis, the length of the first upper protruding pillar is less than the length of the second upper protruding pillar. When viewed in a direction that is perpendicular to the main axis, the length of the first lower protruding pillar is different from the length of the second lower protruding pillar. When viewed in a direction that is perpendicular to the main axis, the length of the first lower protruding pillar is greater than the length of the second lower protruding pillar.

According to some embodiments, the second optical element driving mechanism includes: a second fixed assembly; a second movable assembly, configured to be connected to a second optical element; and a second driving assembly, configured to drive the second movable assembly and the second optical element to move relative to the second fixed assembly. The second fixed assembly includes a casing and a second base. The casing is affixed to the second base to form an accommodation space. The accommodation space is configured to accommodate the second movable assembly and the second driving assembly.

According to some embodiments, the casing surrounds a portion of the first optical element driving mechanism. When viewed in a direction that is perpendicular to the main axis, a portion of the first optical element driving mechanism protrudes from the casing. The second movable assembly includes a holder and a second frame. At least a portion of the first optical element driving mechanism is disposed on the second optical element. The second frame surrounds a portion of the first optical element driving mechanism. When viewed in a direction that is perpendicular to the main axis, the second frame overlaps at least a portion of the first frame.

According to some embodiments, the first movable element includes a first body and a radial extending portion. The first body has a ring structure. The radial extending portion radially extends from the first body. The radial extending portion has a receiving groove. The first driving assembly includes a first magnetic element disposed in the receiving groove.

According to some embodiments, when viewed along the main axis, the radial extending portion has an arc-shaped structure. When viewed along the main axis, the first magnetic element has an arc-shaped structure. The shape of the arc-shaped structure of the first magnetic element corresponds to the shape of the arc-shaped structure of the radial extending portion. When viewed along a first axis, the first magnetic element is exposed from the casing. The first axis is perpendicular to the main axis. When viewed in a direction that is perpendicular to the main axis, the first magnetic element overlaps the top surface of the casing.

According to some embodiments, the second optical element driving mechanism further includes an anti-reflection element disposed on the top surface of the casing. The anti-reflection element is made of a plastic material. The casing is made of a metal material. The anti-reflection element has an opening. The casing has a casing opening. The pore diameter of the opening is smaller than the pore diameter of the casing opening. The anti-reflection element completely covers the top surface of the casing.

According to some embodiments, the second optical element driving mechanism further includes a circuit assembly electrically connected to the first driving assembly and the second driving assembly. The circuit assembly includes a substrate, a sharing element, a first circuit element and a second circuit element. The sharing element, the first circuit element and the second circuit element are integrally formed as one piece. The substrate is disposed on the second base. The sharing element, the first circuit element and the second circuit element each has a long strip-shaped structure. The sharing element extends along a second axis from the substrate. The second axis is perpendicular to the first axis. The second axis is parallel to the main axis.

According to some embodiments, the first circuit element is configured to be electrically connected to the first driving assembly. When viewed along the first axis, the first circuit element extends in a first direction from the sharing element. The second circuit element is configured to be electrically connected to a second position sensing element. When viewed along the first axis, the second circuit element extends in a second direction from the sharing element. The first direction is the opposite of the second direction.

According to some embodiments, the first circuit element includes a first extending portion, a second extending portion, a third extending portion and a first contact portion. The first extending portion is connected between the sharing element and the second extending portion. The second extending portion is connected between the first extending portion and the third extending portion. The third extending portion is connected to the first contact portion. When viewed along the main axis, the first extending portion and the third extending portion extend along a third axis. The third axis is perpendicular to the second axis and the first axis.

According to some embodiments, when viewed along the main axis, the second extending portion and the first contact portion extend along the first axis. When viewed along the main axis, the first extending portion, the second extending portion, the third extending portion and the first contact portion contact the second frame. The second frame has a front side wall and a concave structure. The concave structure is concaved from the front side wall along the third axis. The third extending portion and the first contact portion are disposed in the concave structure.

According to some embodiments, the first driving assembly further includes a first coil. The first coil is fixedly disposed on the first contact portion. The second frame further has a positioning structure. The positioning structure has a long strip-shaped structure that extends along the second axis. The first contact portion is fixedly connected to the positioning structure.

According to some embodiments, when viewed along the third axis, the first coil is located in the positioning structure. When viewed along the third axis, the first contact portion completely covers the first coil. When viewed along the third axis, the first contact portion, the positioning structure and the first coil extend beyond the second optical element driving mechanism.

The present disclosure provides an optical system including a first optical element driving mechanism and a second optical element driving mechanism. The first optical element driving mechanism may serve as an aperture mechanism, configured to adjust the amount of light entering the optical system. The second optical element driving mechanism can achieve the functions of auto-focusing (AF) and optical image stabilization (OIS).

In some embodiments, the second frame has a concave structure and a positioning structure, the positioning structure is located in the concave structure, and the first contact portion is fixed in the positioning structure. The first coil is fixedly disposed on the first contact portion, so that the minimum distance between the first coil and the first magnetic element is fixed, thus ensuring that the electromagnetic driving force generated by the first driving assembly remains fixed. Furthermore, based on the configuration of the first coil, the first magnetic element and the first movable element, the aperture size of the first optical element driving mechanism can be continuously changed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
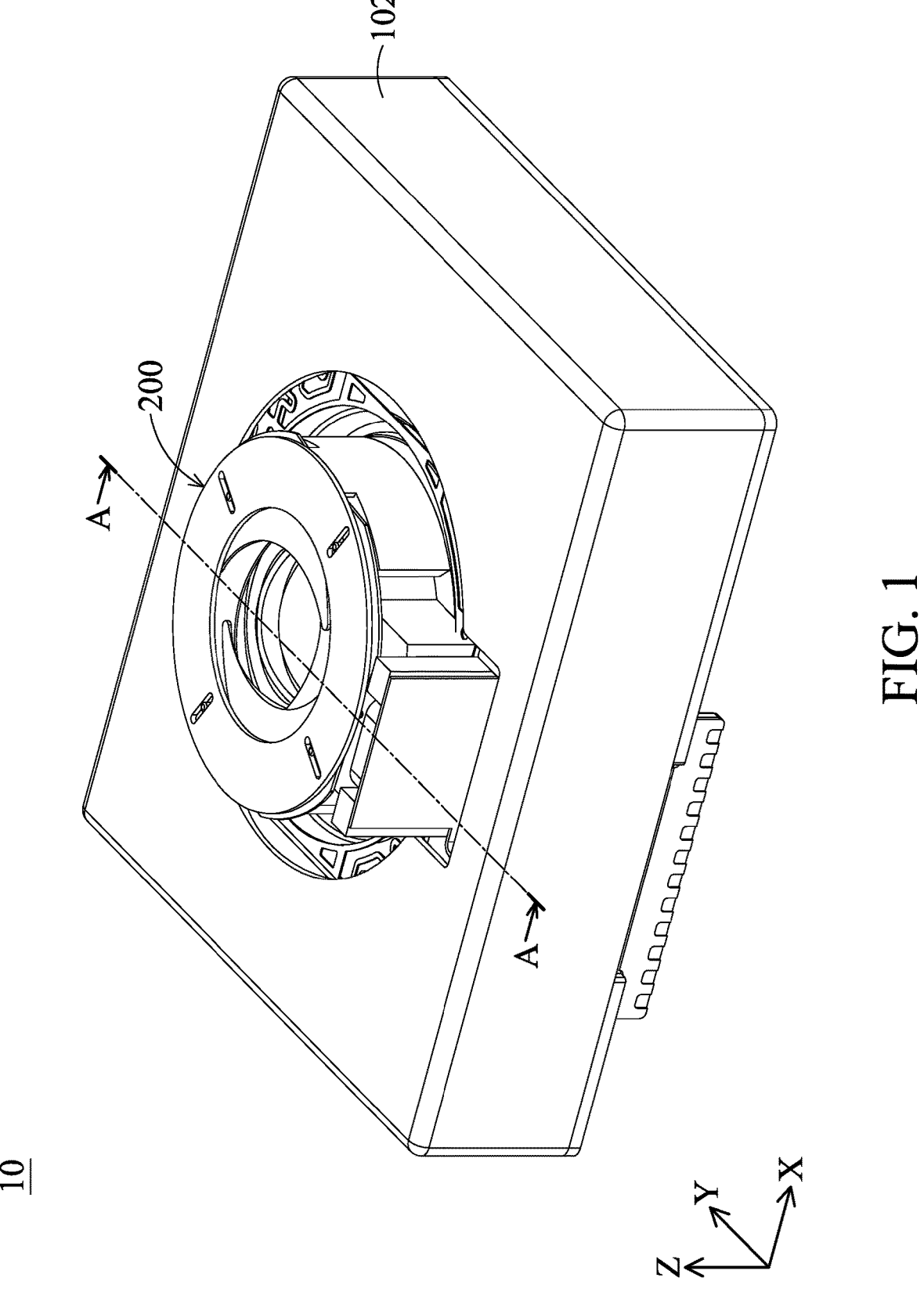
FIG. 1 is a schematic diagram of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
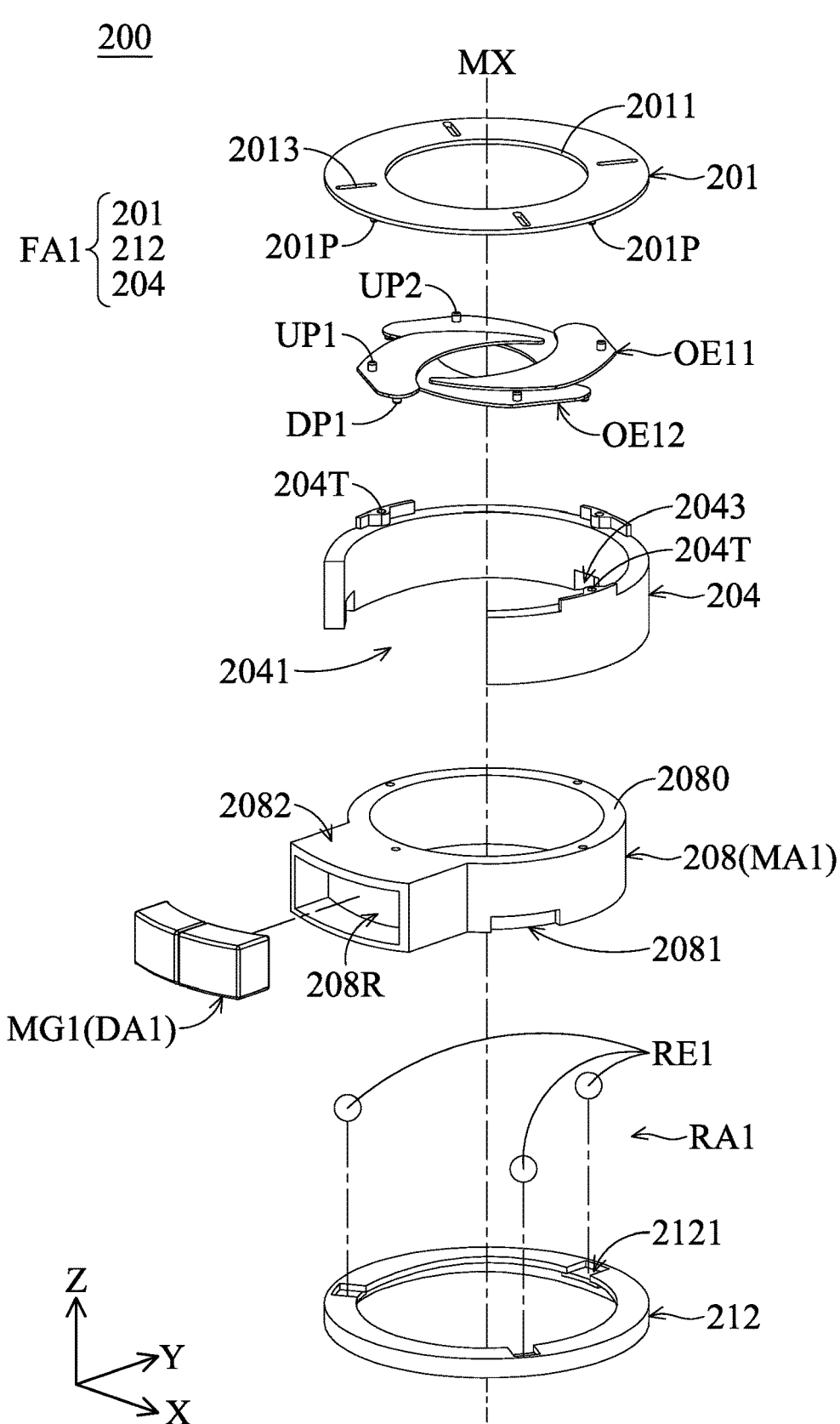
FIG. 2 is an exploded diagram of a first optical element driving mechanism 200 according to an embodiment of the present disclosure.
Figure 3:
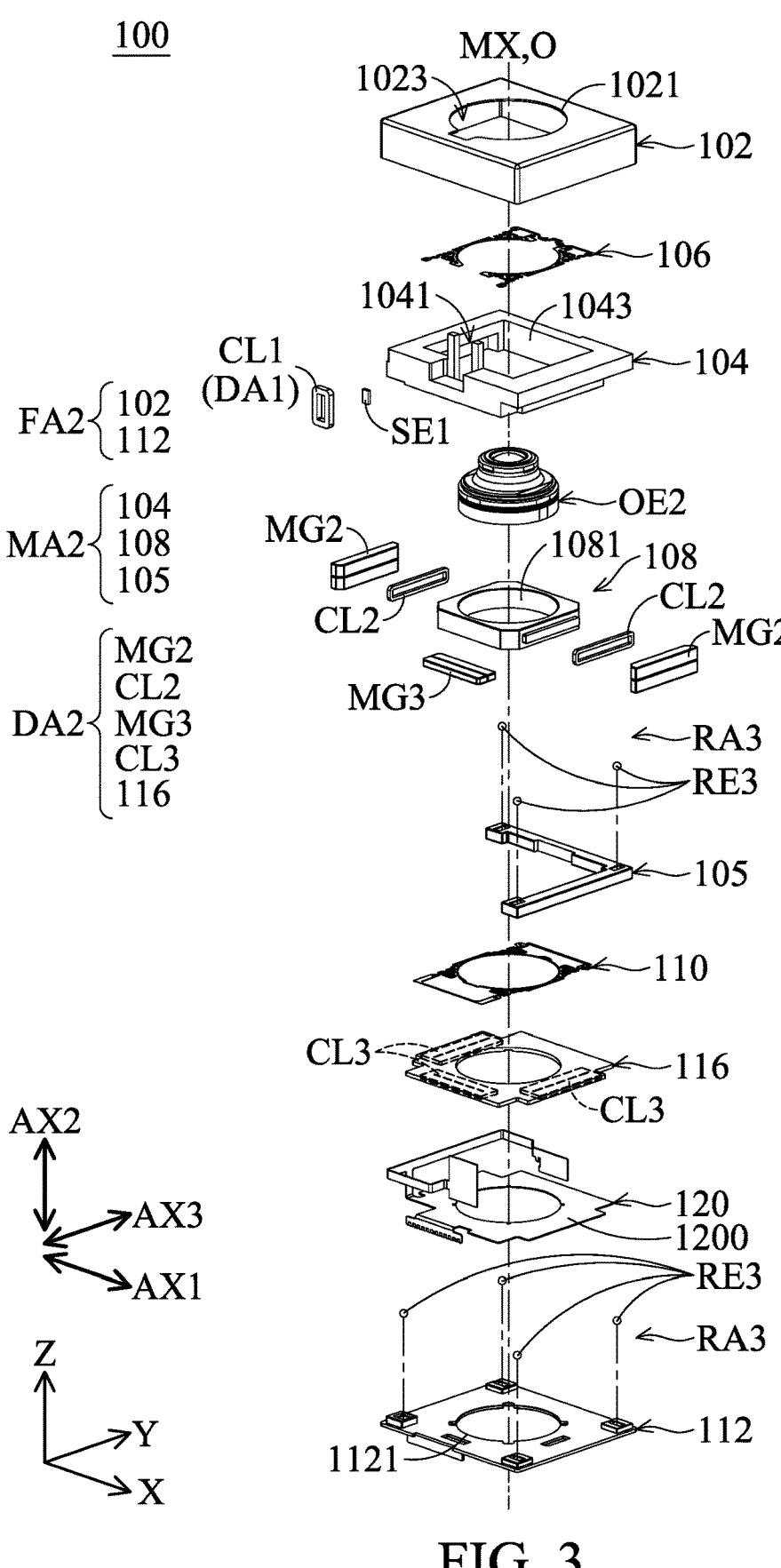
FIG. 3 is an exploded diagram of a second optical element driving mechanism 100 according to an embodiment of the present disclosure.

Please refer to FIG. 1 to FIG. 3. FIG. 1 is a schematic diagram of an optical system 10 according to an embodiment of the present disclosure, FIG. 2 is an exploded diagram of a first optical element driving mechanism 200 according to an embodiment of the present disclosure, and FIG. 3 is an exploded diagram of a second optical element driving mechanism 100 according to an embodiment of the present disclosure. The optical system 10 can be an optical camera system and can be configured to hold and drive an optical element. The optical system 10 can be installed in various electronic devices or portable electronic devices, such as a smartphone, for allowing a user to perform the image capturing function. In this embodiment, the optical system 10 can be a voice coil motor (VCM) with an auto-focusing (AF) function, but it is not limited thereto. In other embodiments, the optical system 10 can also perform the functions of auto-focusing and optical image stabilization (OIS).

In this embodiment, the optical system 10 may include the first optical element driving mechanism 200 and the second optical element driving mechanism 100. The first optical element driving mechanism 200 may serve as an aperture mechanism, configured to adjust the amount of light entering the optical system 10. The second optical element driving mechanism 100 can be the aforementioned voice coil motor, so that the optical system 10 can have auto focus (AF) and optical anti-shake (OIS) functions. In this embodiment, the first optical element driving mechanism 200 is disposed on the second optical element driving mechanism 100.

The first optical element driving mechanism 200 includes a first fixed assembly FA1, a first movable assembly MA1, and a first driving assembly DA1. The first movable assembly MA1 is configured to be connected to at least two first optical elements, and the first movable assembly MA1 is movable relative to the first fixed assembly FA1. The first movable assembly MA1 may include a first movable element 208. The first driving assembly DA1 is configured to drive the first movable assembly MA1 to move relative to the first fixed assembly FA1.

As shown in FIG. 2, the first fixed assembly FA1 and the first movable assembly MA1 are arranged along a main axis MX, and the first driving assembly DA1 is configured to drive the first movable element 208 to move around the main axis MX. A first magnetic element MG1 of the first driving assembly DA1 is disposed on the first movable element 208.

The first fixed assembly FA1 may include an outer shielding member 201, a first frame 204 and a first base 212. The first frame 204 is affixed to the first base 212, the outer shielding member 201 is affixed to the first frame 204, and the first frame 204 is located between the outer shielding member 201 and the first base 212.

When viewed along the main axis MX, the outer shielding member 201 has a ring structure and a first outer opening 2011. Furthermore, a plurality of fixed pillars 201P can be formed on the bottom of the outer shielding member 201 and are configured to be inserted into a plurality of fixed slots 204T on the first frame 204, respectively.

Furthermore, the first movable element 208 is disposed in the first frame 204, and the first movable element 208 is rotatable around the main axis MX relative to the first frame 204. Specifically, the first optical element driving mechanism 200 may further include a first rolling assembly RA1 disposed between the first movable element 208 and the first base 212. The first rolling assembly RA1 (for example, the first rolling element RE1 in FIG. 5) is also disposed between the first frame 204 and the first movable element 208, as shown in FIG. 5.

In this embodiment, the first rolling assembly RA1 includes at least three first rolling elements RE1. The first rolling element RE1 is, for example, a sphere, and is disposed in a groove 2121 of the first base 212, an accommodating groove 2043 of the first frame 204 and a groove 2081 of the first movable element 208, so that the first movable element 208 rotates around the main axis MX relative to the first base 212 and the first frame 204 by these first rolling elements RE1.

Figure 4:
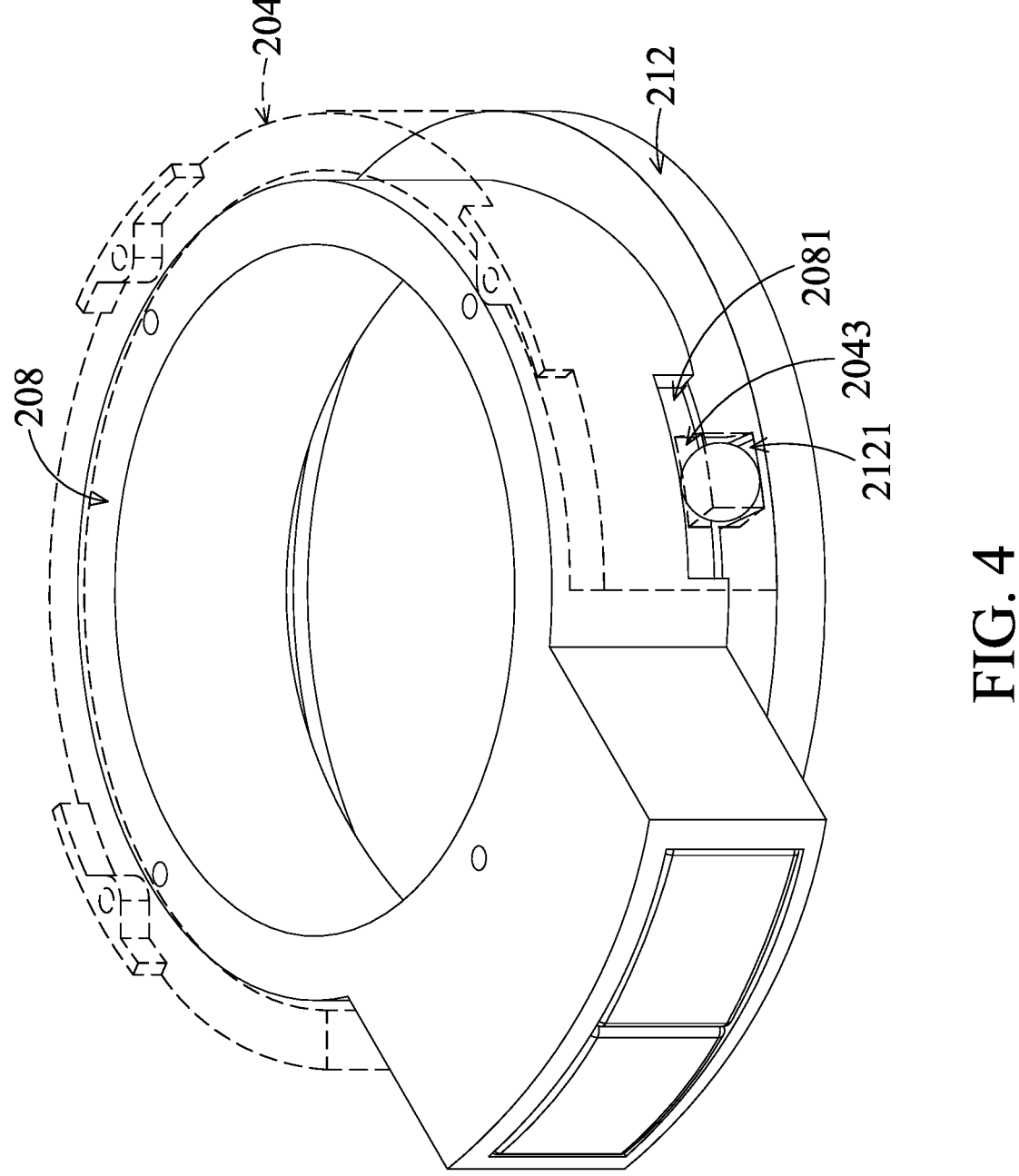
FIG. 4 is a perspective view of a partial structure of the first optical element driving mechanism 200 according to an embodiment of the present disclosure.
Figure 5:
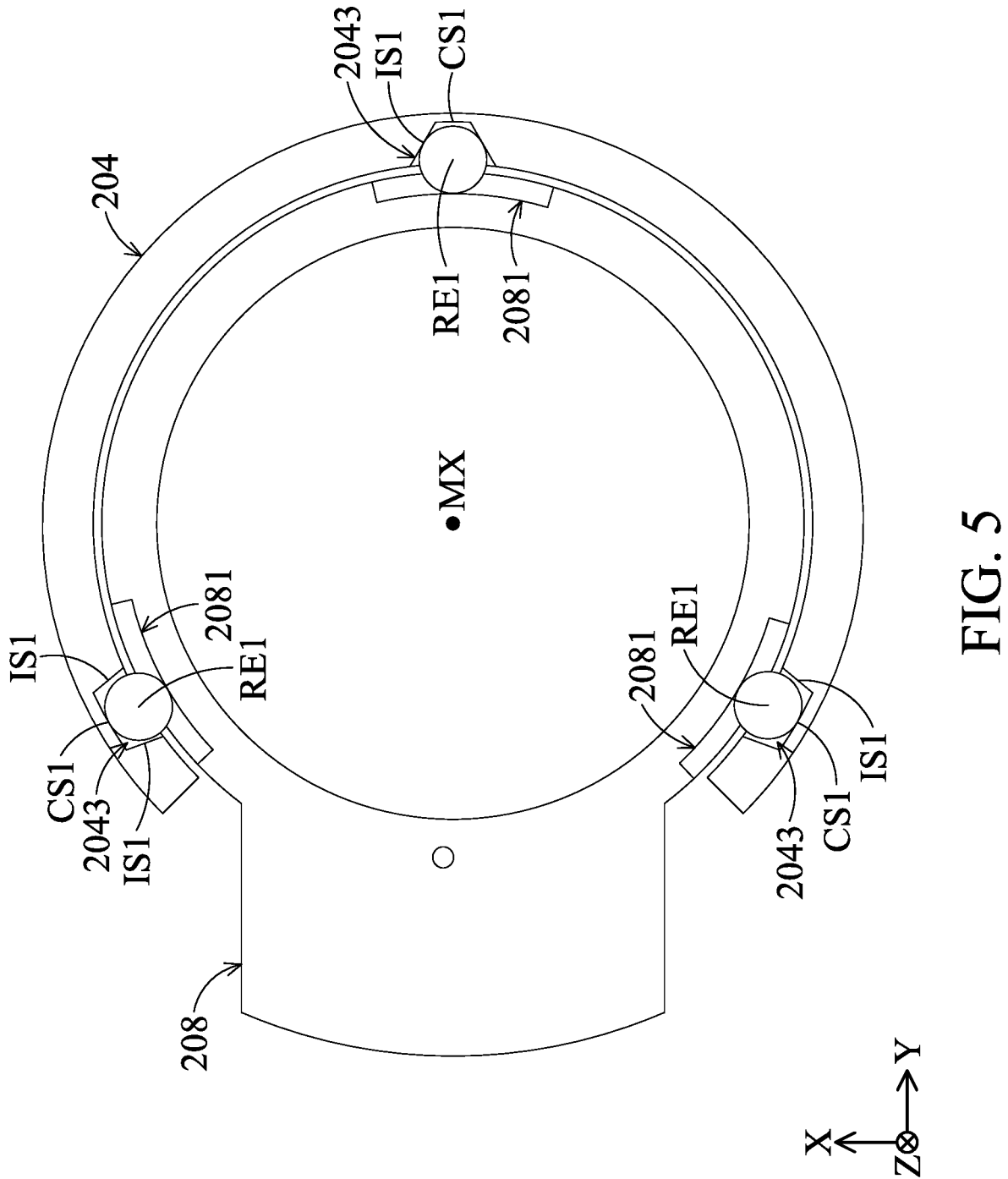
FIG. 5 is a bottom view of a partial structure of the first optical element driving mechanism 200 according to an embodiment of the present disclosure.

Please continue to refer to FIG. 2, FIG. 4 and FIG. 5. FIG. 4 is a perspective view of a partial structure of the first optical element driving mechanism 200 according to an embodiment of the present disclosure, and FIG. 5 is a bottom view of a partial structure of the first optical element driving mechanism 200 according to an embodiment of the present disclosure. The first frame 204 has three accommodating grooves 2043, and the first movable element 208 has three grooves 2081, corresponding to the above-mentioned three accommodating grooves 2043, respectively.

Correspondingly, the first base 212 has three grooves 2121, respectively corresponding to the above-mentioned three grooves 2081. The three first rolling elements RE1 are respectively disposed in the three accommodating grooves 2043, the three grooves 2081 and the three grooves 2121. As shown in FIG. 5, when viewed along the main axis MX, each of these accommodating grooves 2043 has two side surfaces IS1 and a connecting surface CS1. As shown in FIG. 5, the first frame 204 does not overlap the first movable element 208 when viewed along the main axis MX. As shown in FIG. 5, when viewed along a direction perpendicular to the main axis MX and toward the main axis MX, the first rolling assembly RA1 (for example, the first rolling elements RE1 in FIG. 5) is fully exposed from the first movable element 208. As shown in FIG. 5, when viewed along a direction perpendicular to the main axis MX and away from the main axis MX, the first rolling assembly RA1 (for example, the first rolling elements RE1 in FIG. 5) is fully exposed from the first frame 204. As shown in FIG. 5, at least a portion of the first rolling assembly RA1 does not overlap with the first frame 204 and the first movable element 208 when viewed along the main axis MX. As shown in FIG. 5, the at least three accommodating grooves 2043 and the at least three grooves 2081 of the first movable element do not overlap when viewed along the main axis MX.

The connecting surface CS1 is connected between the two side surfaces IS1, and the connecting surface CS1 is neither parallel nor perpendicular to the two side surfaces IS1. It is worth noting that one of the three first rolling elements RE1 (the first rolling element RE1 on the right side in FIG. 5) is configured to be in contact with the two side surfaces IS1 of the corresponding accommodating groove 2043 instead of being in contact with the corresponding connecting surface CS1, and the minimum distance between the two side surfaces IS1 of the accommodating groove 2043 is less than the diameter of the first rolling element RE1.

The other two of the three first rolling elements RE1 (the two first rolling elements RE1 on the left side in FIG. 5) are configured to be in contact with the connecting surface CS1 of the corresponding accommodating groove 2043, and the minimum distance between the two sides surfaces IS1 of the accommodating groove 2043 is greater than or equal to the diameter of the first rolling element RE1. It is worth noting that when the first movable element 208 rotates relative to the first frame 204, the first rolling element RE1 in the upper left corner (or the lower left corner) may not be in contact with the corresponding two side surfaces IS1, or may only be in contact with one of the corresponding side surfaces IS1.

Figure 6:
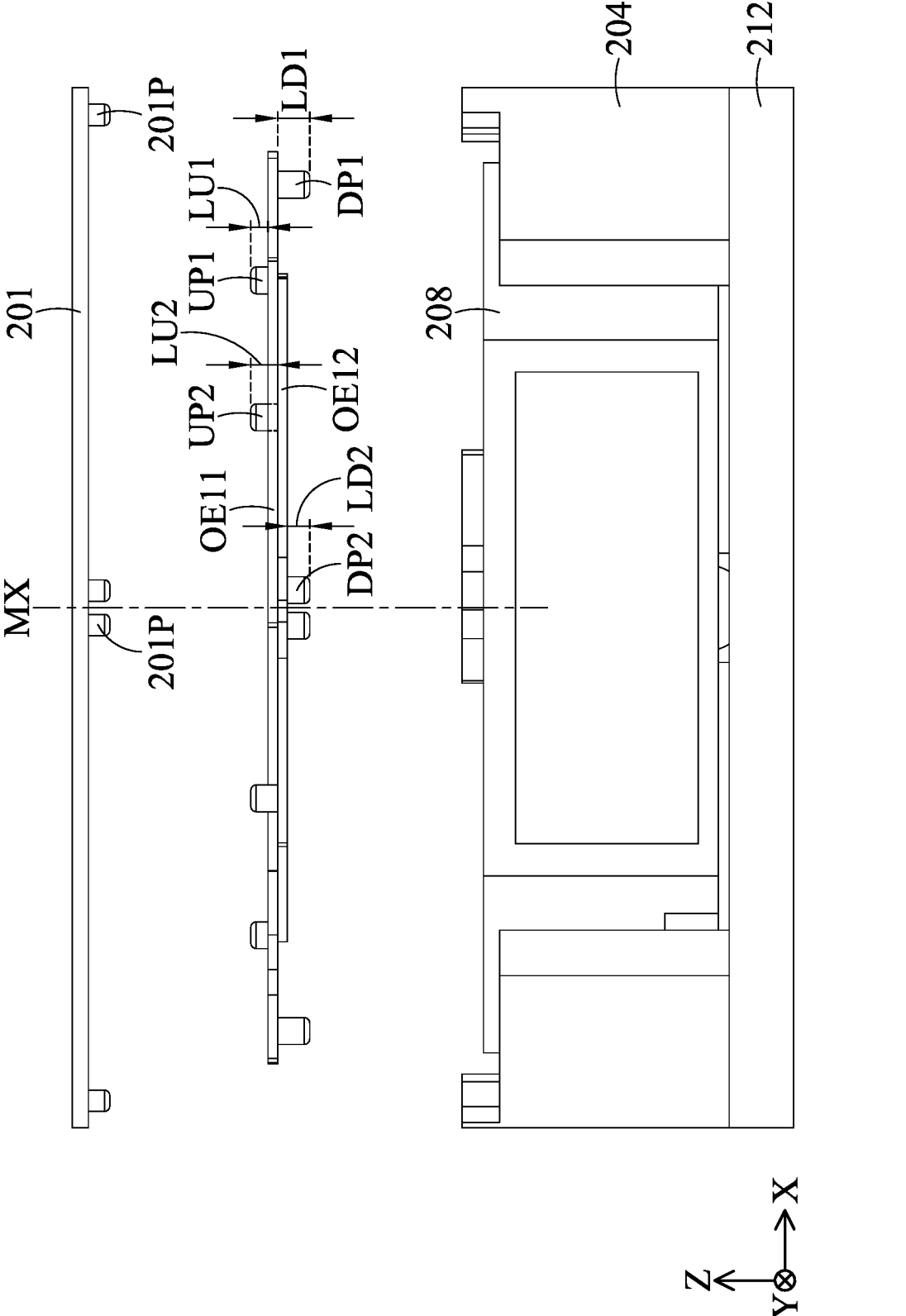
FIG. 6 is an exploded front view of the first optical element driving mechanism 200 according to an embodiment of the present disclosure.

Please refer to FIG. 2 and FIG. 6. FIG. 6 is an exploded front view of the first optical element driving mechanism 200 according to an embodiment of the present disclosure. In this embodiment, the first optical element driving mechanism 200 may include two first optical elements OE11 and two first optical elements OE12, which are movably connected to the first movable element 208. The number of the first optical element is not limited to this embodiment. When the first movable element 208 rotates around the main axis MX, the first optical elements OE11 and two first optical elements OE12 can move relative to the first fixed assembly FA1 and the first movable assembly MA1, thereby adjusting the amount of external light entering the first optical element driving mechanism 200 from the exterior.

Specifically, four first guiding grooves 2013 are formed on the outer shielding member 201, each first optical element OE11 has a first upper protruding pillar UP1 and a first lower protruding pillar DP1, and each first optical element OE12 has a second upper protruding pillar UP2 and a second lower protruding pillar DP2. When viewed along the main axis MX, the first upper protruding pillar UP1 does not overlap the first lower protruding pillar DP1, and the second upper protruding pillar UP2 does not overlap the second lower protruding pillar DP2.

The first lower protruding pillar DP1 and the second lower protruding pillar DP2 are configured to be inserted into the first movable element 208, and the first guiding grooves 2013 are configured to accommodate the corresponding first upper protruding pillar UP1 and the second upper protruding pillar UP2. When the first movable element 208 rotates around the main axis MX, the first optical element OE11 rotates around the first lower protruding pillar DP1, and the first upper protruding pillar UP1 is configured to move along the corresponding first guiding groove 2013. Similarly, the first optical element OE12 rotates around the second lower protruding pillar DP2, and the second upper protruding pillar UP2 is configured to move along the corresponding first guiding groove 2013. Thus, the first optical elements selectively blocks the first inner opening 2031.

As shown in FIG. 2 and FIG. 6, each of the aforementioned first optical elements OE11, OE12 has a plate-shaped structure. The main axis MX is perpendicular to the extending direction of the plate-shaped structure. For example, the plate-shaped structure extends along the X-axis and the Y-axis, and the main axis MX is parallel to the Z-axis. When viewed in a direction that is perpendicular to the main axis MX, the distance between the first optical element OE11 and the first base 212 in the main axis MX is different from the distance between the first optical element OE12 and the first base 212 in the main axis MX.

When viewed in a direction that is perpendicular to the main axis MX, the length LU1 of the first upper protruding pillar UP1 is different from the length LU2 of the second upper protruding pillar UP2. When viewed in a direction that is perpendicular to the main axis MX, the length LU1 of the first upper protruding pillar UP1 is less than the length LU2 of the second upper protruding pillar UP2. When viewed in a direction that is perpendicular to the main axis MX, the length LD1 of the first lower protruding pillar DP1 is different from the length LD2 of the second lower protruding pillar DP2. When viewed in a direction that is perpendicular to the main axis MX, the length LD1 of the first lower protruding pillar DP1 is greater than the length LD2 of the second lower protruding pillar DP2.

The first movable element 208 has a first body 2080 and a radial extending portion 2082. When viewed along the main axis MX, the first body 2080 has a ring structure. The radial extending portion 2082 radially extends from the first body 2080, and the radial extending portion 2082 has a receiving groove 208R. The first magnetic element MG1 is fixedly disposed in the receiving groove 208R.

As shown in FIG. 2, the first frame 204 has an arc opening 2041, and the radial extending portion 2082 is exposed from the arc opening 2041. It is worth noting that the angle of the arc opening 2041 is greater than the limit movement angle (the maximum angle of movement) of the first movable element 208.

Next, as shown in FIG. 3, the second optical element driving mechanism 100 includes a second fixed assembly FA2, a second movable assembly MA2 and a second driving assembly DA2. The second movable assembly MA2 is configured to be connected to a second optical element OE2. The second driving assembly DA2 is configured to drive the second movable assembly MA2 and the second optical element OE2 to move relative to the second fixed assembly FA2.

The second fixed assembly FA2 includes a casing 102 and a second base 112. The casing 102 is affixed to the second base 112 to form an accommodation space 1023, and the accommodation space 1023 is configured to accommodate the second movable assembly MA2 and the second driving assembly DA2. Additionally, as shown in FIG. 1, the casing 102 may surround a portion of the first optical element driving mechanism 200.

Furthermore, in this embodiment, the second movable assembly MA2 may include a second frame 104, a holder 108 and an intermediate bracket 105. The holder 108 is configured to hold the second optical element OE2.

As shown in FIG. 3, the aforementioned casing 102 has a hollow structure, and a casing opening 1021 is formed thereon, and a base opening 1121 is formed on the second base 112. The center of the casing opening 1021 corresponds to an optical axis O of the second optical element OE2 held by the holder 108, and the base opening 1121 corresponds to an image sensing element (not shown) disposed under the second base 112.

As shown in FIG. 3, the holder 108 has a hollow annular structure, and has a through hole 1081. The through hole 1081 forms a threaded structure (not shown) corresponding to another threaded structure (not shown) on the second optical element OE2, such that the second optical element OE2 can be locked in the through hole 1081. Furthermore, the second driving assembly DA2 may include two second coils CL2 disposed on the holder 108.

In this embodiment, the second driving assembly DA2 may further include two second magnetic elements MG2 and a third magnetic element MG3. The second frame 104 has a plurality of grooves 1041 and a central opening 1043. In this embodiment, the second frame 104 has three grooves 1041 for accommodating the aforementioned second magnetic elements MG2 and third magnetic element MG3, but the number of grooves 1041 and magnetic elements is not limited to this embodiment. The holder 108 and the aforementioned second optical element OE2 are disposed in the central opening 1043 and can move relative to the second frame 104. In this embodiment, the first magnetic element MG1, the second magnetic element MG2 and the third magnetic element MG3 can be magnets, but they are not limited thereto.

Furthermore, the second driving assembly DA2 may further include a circuit board 116. The circuit board 116 has three third coils CL3 disposed therein. The number of the third coils CL3 is not limited to this embodiment. The second optical element driving mechanism 100 further includes a circuit assembly 120 electrically connected to the second driving assembly DA2. Specifically, the circuit assembly 120 is electrically connected to the circuit board 116 and an external control circuit, and the external control circuit can control the third coils CL3 to be turned on or off. The circuit assembly 120 may be a flexible circuit board, but it is not limited thereto.

In this embodiment, the optical system 10 may further include a first elastic element 106 and a second elastic element 110, and the holder 108 may be connected to the second frame 104 through the first elastic element 106 and the second elastic element 110 to be suspended in the central opening 1043. When the second coils CL2 are energized, the two second magnetic elements MG2 act with the second coils CL2 to generate an electromagnetic driving force, thereby driving the holder 108 to move along the optical axis O (the Z-axis) relative to the second frame 104 to perform the auto focusing function.

As shown in FIG. 3, the second optical element driving mechanism 100 may further include a third rolling assembly RA3. The third rolling assembly RA3 may include seven third rolling elements RE3 (balls). three of the third rolling elements RE3 are disposed between the second frame 104 and the intermediate bracket 105, other three third rolling elements RE3 are disposed between the intermediate bracket 105 and the second base 112, and the last third rolling element RE3 is disposed between the second frame 104 and the second base 112.

Therefore, the second frame 104 can move along a third axis AX3 (the Y-axis) relative to the intermediate bracket 105 by the third rolling assembly RA3, and the intermediate bracket 105 and the second frame 104 can move along a first axis AX1 (the X-axis) relative to the second base 112 by the third rolling assembly RA3. The third axis AX3 is perpendicular to the first axis AX1.

When the third coils CL3 are energized and are induced with the corresponding second magnetic elements MG2 and the third magnetic element MG3, an electromagnetic driving force is generated to drive the second frame 104 to drive the holder 108 to move along the Y-axis or along the X-axis. Therefore, when the optical system 10 is shaken, the holder 108 can be driven by the aforementioned electromagnetic driving force to move on the X-Y plane, so as to achieve the purpose of optical image stabilization.

Figure 7:
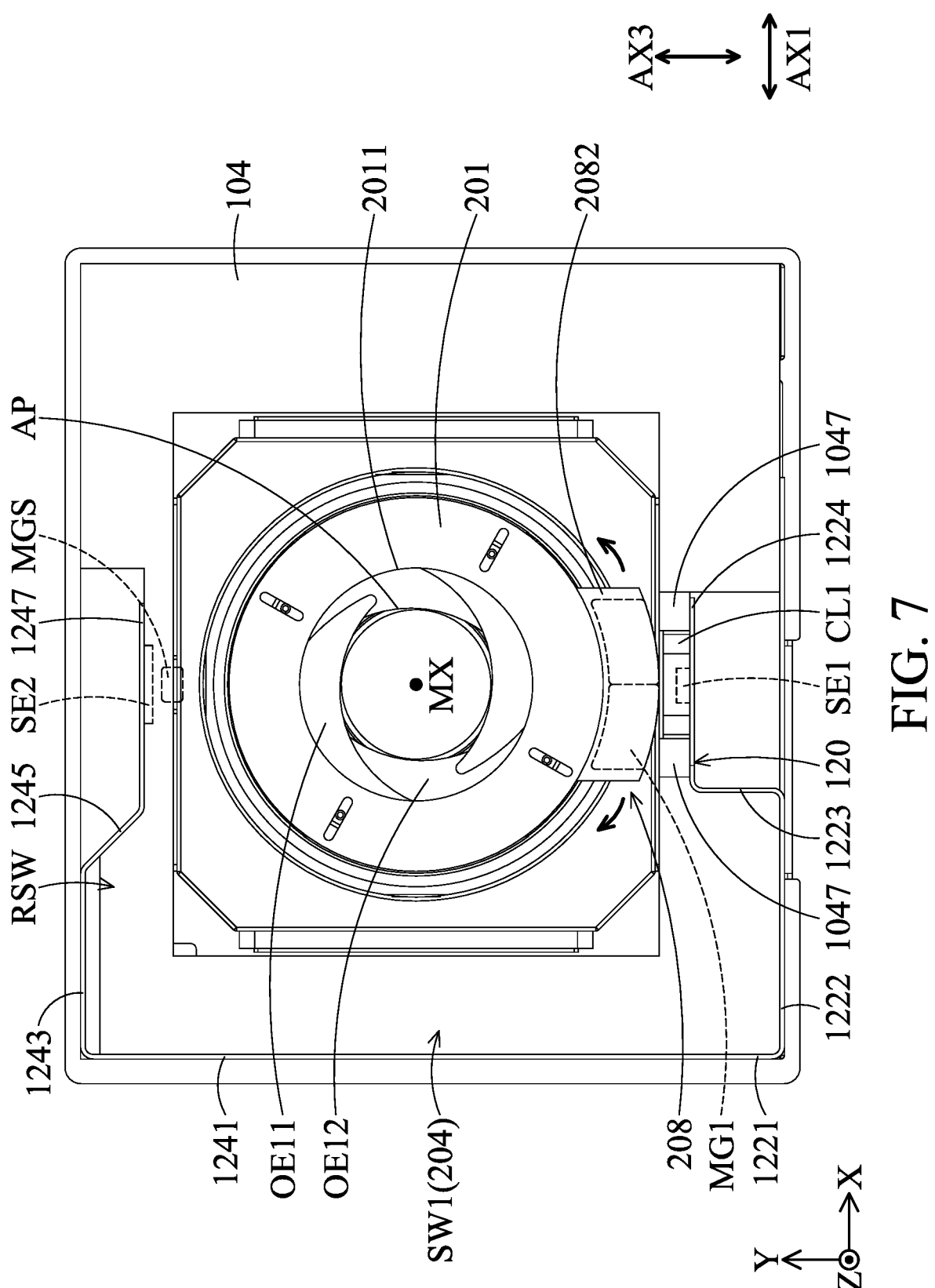
FIG. 7 is a top view of a partial structure of the optical system 10 according to an embodiment of the present disclosure.

Please refer to FIG. 2 and FIG. 7, and FIG. 7 is a top view of a partial structure of the optical system 10 according to an embodiment of the present disclosure. The first driving assembly DA1 further includes a first coil CL1 corresponding to the first magnetic element MG1 respectively. The first coil CL1 is fixedly disposed on the circuit assembly 120 and electrically connected to the circuit assembly 120. When the first coil CL1 is energized, the first coil CL1 can act with the first magnetic element MG1 to generate an electromagnetic driving force to drive the first movable element 208 to move around the main axis MX.

Figure 8:
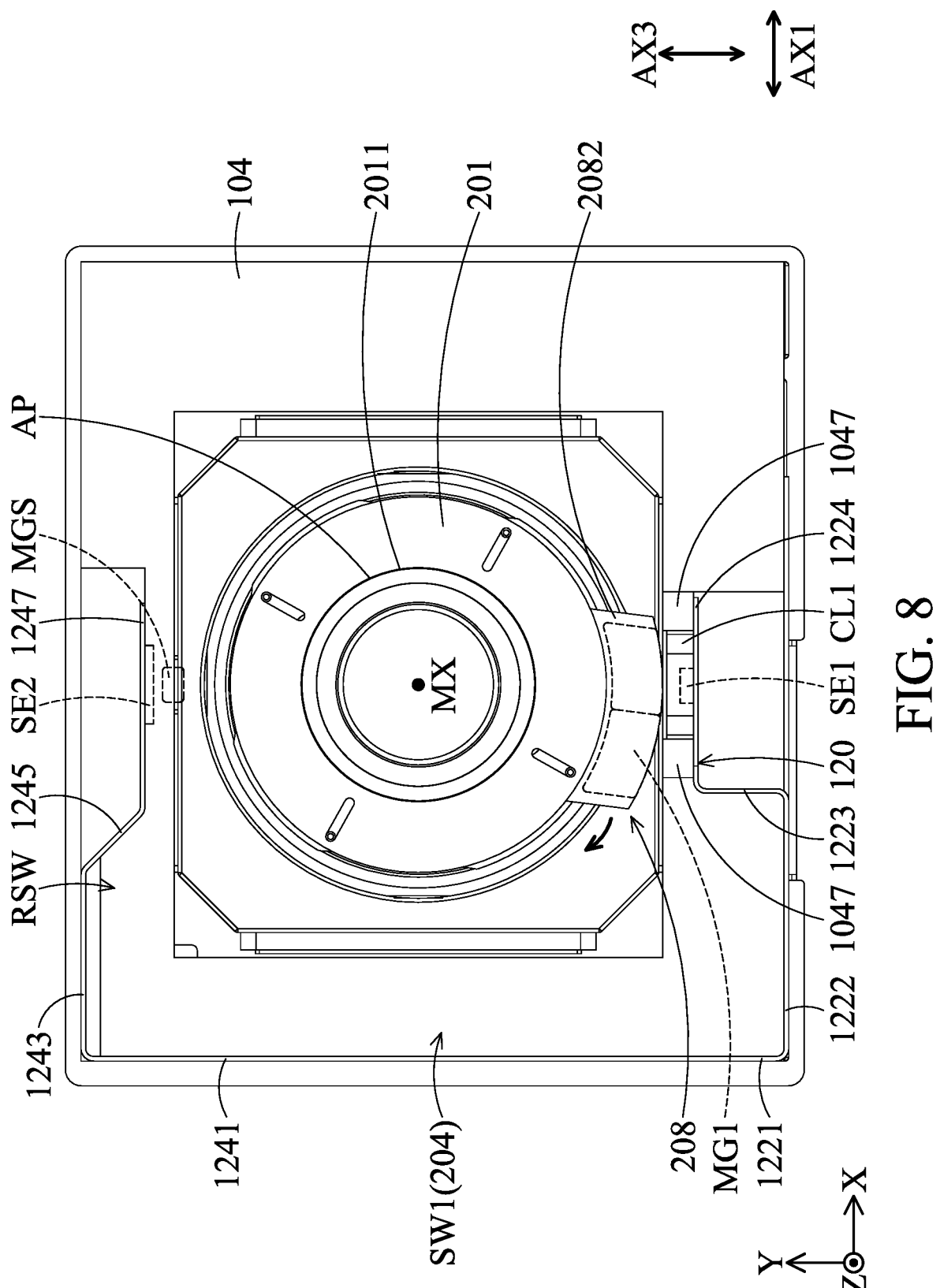
FIG. 8 is a top view of the first movable element 208 in a first extreme position according to an embodiment of the present disclosure.
Figure 9:
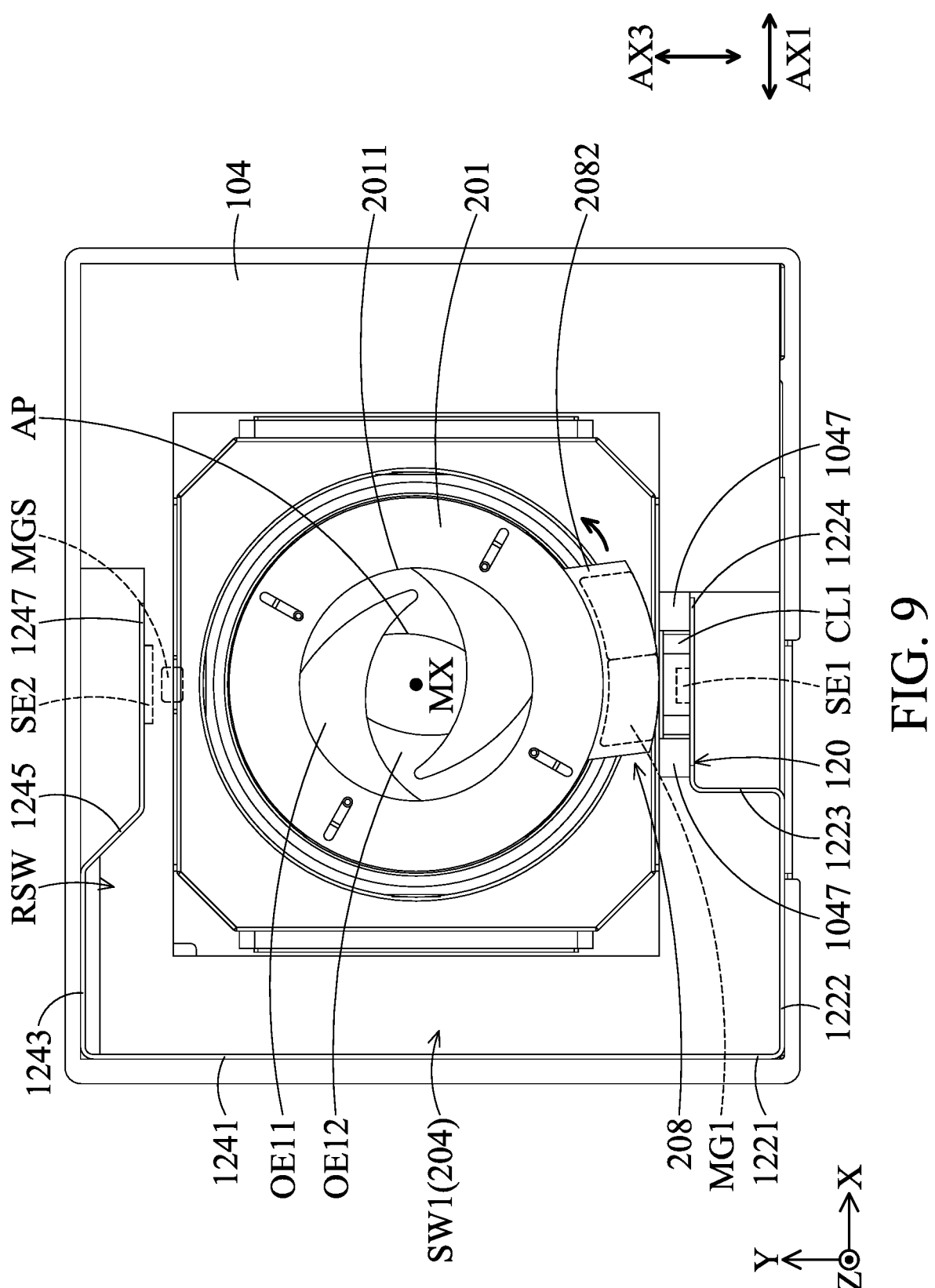
FIG. 9 is a top view of the first movable element 208 in a second extreme position according to an embodiment of the present disclosure.

For example, please refer to FIG. 7 to FIG. 9. FIG. 8 is a top view of the first movable element 208 in a first extreme position according to an embodiment of the present disclosure, and FIG. 9 is a top view of the first movable element 208 in a second extreme position according to an embodiment of the present disclosure. When the first coil CL1 is energized, the first movable element 208 can be driven to move between the first extreme position and the second extreme position, thereby driving the first optical elements (the blades) to move, changing the amount of light that enters the first optical element driving mechanism 200.

For example, as shown in FIG. 8, when the first movable element 208 is in the first extreme position, the first optical elements are accommodated under the outer shielding member 201, so that the aperture AP of the first optical element driving mechanism 200 is the largest size. Then, when it is desired to adjust the size of the aperture AP, the first movable element 208 can be driven to move from the first extreme position in FIG. 8 to the position in FIG. 7, so that the four first optical elements OE11, OE12 begin to shield the first outer opening 2011, and therefore the aperture AP is gradually narrowed.

Furthermore, as shown in FIG. 9, when the first movable element 208 moves from the position in FIG. 7 to the second extreme position in FIG. 9, the four first optical elements OE11, OE12 continue to shield the first outer opening 2011, so that the aperture AP gradually shrinks to its minimum size. Based on the above structural configuration, the size of the aperture AP of the first optical element driving mechanism 200 can be continuously changed, so that the image captured by the optical system 10 can be clearer.

It is worth noting that, as shown in FIG. 7 to FIG. 9, when viewed along the main axis MX, the radial extending portion 2082 has an arc-shaped structure. When viewed along the main axis MX, the first magnetic element MG1 has an arc-shaped structure, and the shape of the arc-shaped structure of the first magnetic element MG1 corresponds to the shape of the arc-shaped structure of the radial extending portion 2082. Based on such a structural design, it can be ensured that when the first movable element 208 rotates around the main axis MX, the first driving assembly DA1 has sufficient electromagnetic driving force, and the collision of the radial extending portion 2082 with the first coil CL1 can be avoided.

Figure 10:
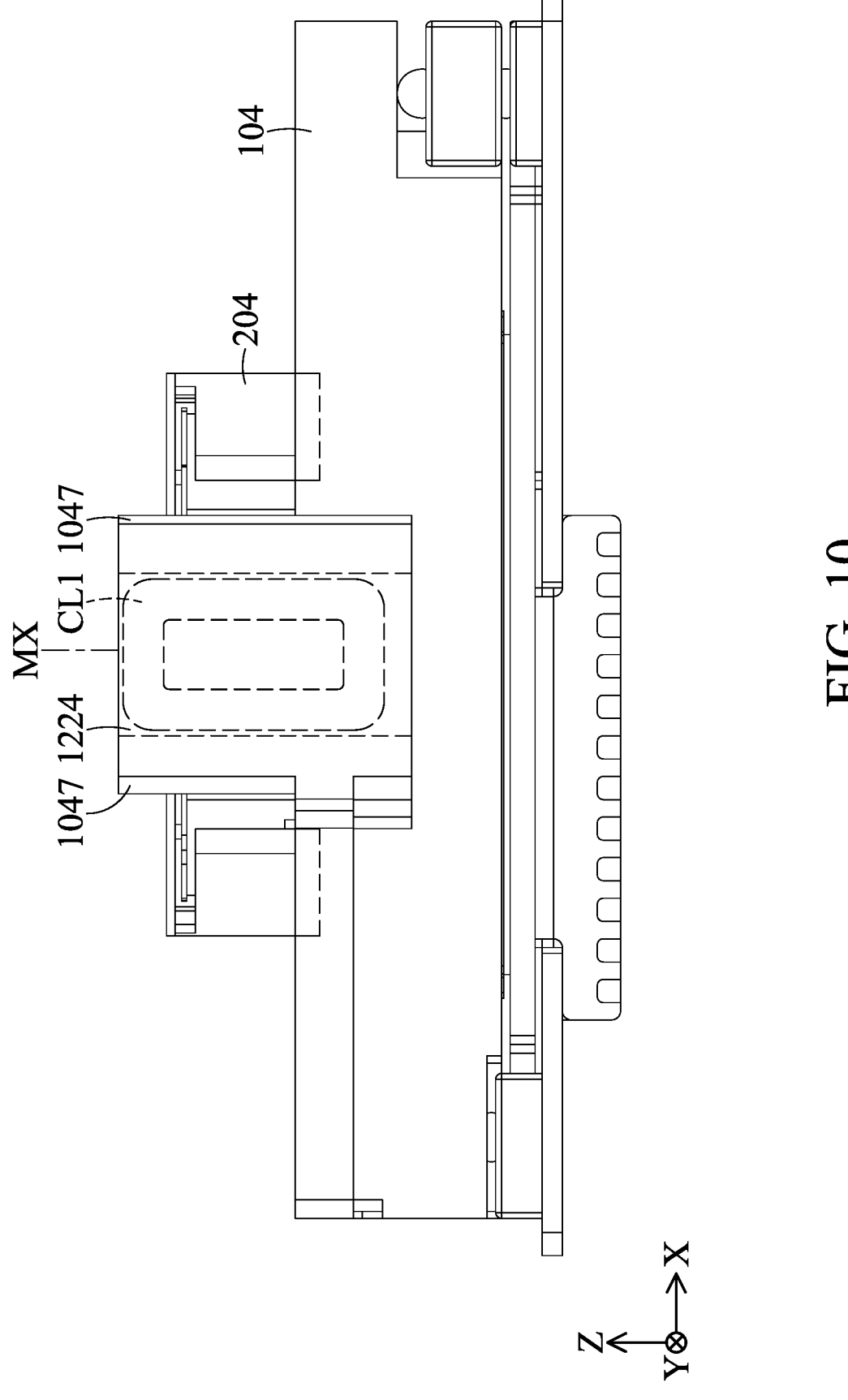
FIG. 10 is a front view of the optical system 10 after removing the casing 102 according to an embodiment of the present disclosure.
Figure 11:
FIG. 11 is a cross-sectional view of the optical system 10 along line A-A in FIG. 1 according to an embodiment of the present disclosure.

Next, please refer to FIG. 10 and FIG. 11. FIG. 10 is a front view of the optical system 10 after removing the casing 102 according to an embodiment of the present disclosure, and FIG. 11 is a cross-sectional view of the optical system 10 along line A-A in FIG. 1 according to an embodiment of the present disclosure. As shown in FIG. 10, the second frame 104 surrounds a portion of the first optical element driving mechanism 200. Furthermore, when viewed in a direction that is perpendicular to the main axis MX, the second frame 104 overlaps at least a portion of the first frame 204.

As shown in FIG. 11, when viewed in a direction that is perpendicular to the main axis MX, a part of the first optical element driving mechanism 200 protrudes from the casing 102, and at least a portion of the first optical element driving mechanism 200 is disposed on the second optical element OE2. For example, the first base 212 is disposed on the second optical element OE2.

Furthermore, as shown in FIG. 11, when viewed along the first axis AX1 (the X-axis), the first magnetic element MG1 is exposed from the casing 102. The first axis AX1 is perpendicular to the main axis MX. When viewed in a direction (such as the Y-axis) perpendicular to the main axis MX, the first magnetic element MG1 overlaps a top surface 102T of the casing 102.

In this embodiment, the second optical element driving mechanism 100 further includes an anti-reflection element 130 disposed on the top surface 102T of the casing 102. The anti-reflection element 130 can be made of a black plastic material, and the casing 102 can be made of a metal material. It is worth noting that the anti-reflection element 130 has an opening 1301, the pore diameter DD1 of the opening 1301 is smaller than the pore diameter DD2 of the casing opening 1021, and the anti-reflection element 130 completely covers the top surface 102T of the casing 102.

Figure 12:
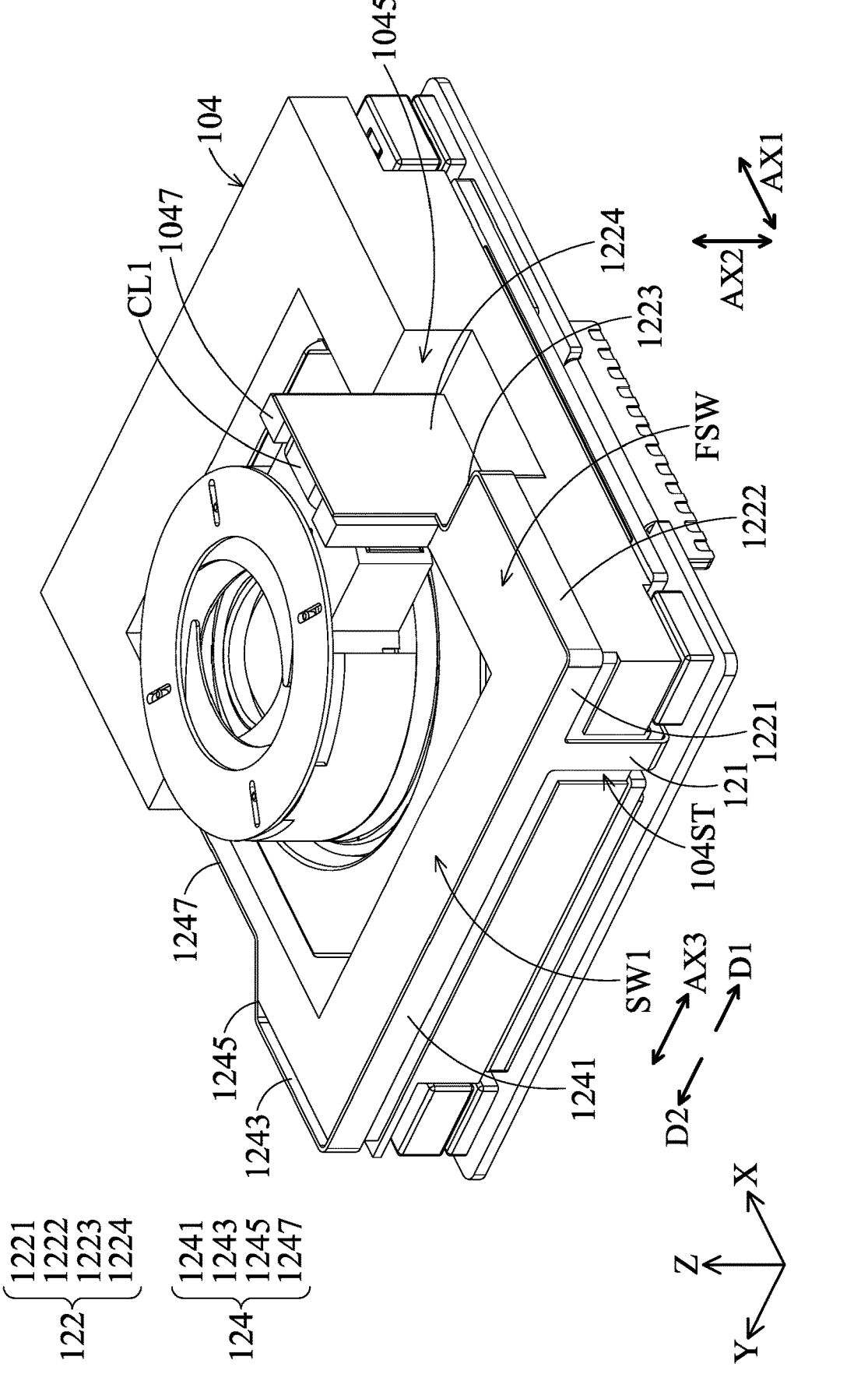
FIG. 12 is a schematic diagram of the optical system 10 after removing the casing 102 according to an embodiment of the present disclosure.

Please refer to FIG. 3, FIG. 7 and FIG. 12. FIG. 12 is a schematic diagram of the optical system 10 after removing the casing 102 according to an embodiment of the present disclosure. In this embodiment, the circuit assembly 120 includes a substrate 1200, a sharing element 121, a first circuit element 122 and a second circuit element 124. It should be noted that the substrate 1200, the sharing element 121, the first circuit element 122 and the second circuit element 124 are integrated formed as one piece.

The substrate 1200 is disposed on the second base 112, the sharing element 121, the first circuit element 122 and the second circuit element 124 each has a long-shaped structure, and the sharing element 121 extends along a second axis AX2 from the substrate 1200. The second axis AX2 is perpendicular to the first axis AX1, and the second axis AX2 is parallel to the main axis MX. The first circuit element 122 is configured to be electrically connected to the first driving assembly DA1 and the first position sensing element SE1. Specifically, the first circuit element 122 is electrically connected to the first coil CL1.

As shown in FIG. 12, when viewed along first axis AX1, the first circuit element 122 extends in a first direction D1 from the sharing element 121. Moreover, as shown in FIG. 7, the second circuit element 124 is configured to be electrically connected to a second position sensing element SE2. As shown in FIG. 12, when viewed along the first axis AX1, the second circuit element 124 extends in a second direction D2 from the sharing element 121. The first direction D1 is opposite to the second direction D2.

In this embodiment, a first side wall SW1 of the second frame 104 forms a side groove 104ST configured to accommodate a portion of the circuit assembly 120. As shown in FIG. 12, when viewed along the first axis AX1, the side groove 104ST has a T-shaped structure. When viewed along the first axis AX1, the sharing element 121, the first circuit element 122 and the second circuit element 124 forms a T-shaped structure, corresponding the side groove 104ST.

In this embodiment, the first circuit element 122 includes a first extending portion 1221, a second extending portion 1222, a third extending portion 1223 and a first contact portion 1224. The first extending portion 1221 is connected between the sharing element 121 and the second extending portion 1222, the second extending portion 1222 is connected between the first extending portion 1221 and the third extending portion 1223, and the third extending portion 1223 is connected to the first contact portion 1224.

When viewed along the main axis MX, the first extending portion 1221 and the third extending portion 1223 extend along the third axis AX3. The third axis AX3 is perpendicular to the second axis AX2 and the first axis AX1. When viewed along the main axis MX, the second extending portion 1222 and the first contact portion 1224 extend along the first axis AX1. When viewed along the main axis MX, the first extending portion 1221, the second extending portion 1222, the third extending portion 1223 and the first contact portion 1224 contact the second frame 104.

As shown in FIG. 12, the second frame 104 has a front side wall FSW and a concave structure 1045. The concave structure 1045 is concaved from the front side wall FSW along the third axis AX3. The third extending portion 1223 and the first contact portion 1224 are disposed in the concave structure 1045.

The first coil CL1 is fixedly disposed on the first contact portion 1224. As shown in FIG. 12, the second frame 104 further has a positioning structure 1047. The positioning structure 1047 has a long strip-shaped structure extending along the second axis AX2. The first contact portion 1224 is fixedly connected to the positioning structure 1047.

That is, the first contact portion 1224 is fixed on the second frame 104. Therefore, the minimum distance between the first coil CL1 and the first magnetic element MG1 in the third axis AX3 is fixed (FIG. 7), which can ensure that the electromagnetic driving force generated by the first driving assembly DA1 remains fixed, so that the first movable element 208 can move stably around the main axis MX.

Similarly, the minimum distance between the first position sensing element SE1 and the corresponding first magnetic element MG1 in the third axis AX3 can also be fixed, so that the sensing accuracy of the first position sensing element SE1 can be increased.

Furthermore, as shown in FIG. 10, when viewed along the third axis AX3, the first coil CL1 is located in the positioning structure 1047. When viewed along the third axis AX3, the first contact portion 1224 completely covers the first coil CL1. When viewed along the third axis AX3, the first contact portion 1224, the positioning structure 1047 and the first coil CL1 extend beyond the second frame 104 of the second optical element driving mechanism 100.

Furthermore, the second circuit element 124 includes a fourth extending portion 1241, a fifth extending portion 1243, a curved portion 1245 and a second contact portion 1247. The fourth extending portion 1241 is connected between the fifth extending portion 1243 and the sharing element 121, and the extending directions of the fourth extending portion 1241 and the fifth extending portion 1243 are different. For example, the fourth extending portion 1241 extends along the third axis AX3, and the fifth extending portion 1243 extends along the first axis AX1.

The curved portion 1245 is connected between the second contact portion 1247 and the fifth extending portion 1243, and the extending direction of the curved portion 1245 is different from the extending direction of the second contact portion 1247 and the fifth extending portion 1243. As shown in FIG. 7, the fourth extending portion 1241 is in contact with the first side wall SW1, the fifth extending portion 1243 is not in contact with a rear side wall RSW of the second frame 104, and a portion of the curved portion 1245 is not in contact with the rear side wall RSW. The second contact portion 1247 is in contact with the rear side wall RSW.

The second position sensing element SE2 is disposed on the second contact portion 1247. When viewed along the main axis MX, the second position sensing element SE2 overlaps the second frame 104. A sensing magnet MGS corresponding to the second position sensing element SE2 is disposed on the holder 108. The second position sensing element SE2 is configured to sense changes of the magnetic field of the sensing magnet MGS to obtain the position of the holder 108 relative to the second frame 104.

As shown in FIG. 7, when viewed along the main axis MX, the distance between the sensing magnet MGS and the second contact portion 1247 in the third axis AX3 is less than the distance between the sensing magnet MGS and the fifth extending portion 1243 in the third axis AX3. Based on the above structural configuration, the sensing accuracy of the second position sensing element SE2 can be increased.

In conclusion, the present disclosure provides an optical system 10 including a first optical element driving mechanism 200 and a second optical element driving mechanism 100. The first optical element driving mechanism 200 may serve as an aperture mechanism, configured to adjust the amount of light entering the optical system 10. The second optical element driving mechanism 100 can achieve the functions of auto-focusing (AF) and optical image stabilization (OIS).

In some embodiments, the second frame 104 has a concave structure 1045 and a positioning structure 1047, the positioning structure 1047 is located in the concave structure 1045, and the first contact portion 1224 is fixed in the positioning structure 1047. The first coil CL1 is fixedly disposed on the first contact portion 1224, so that the minimum distance between the first coil CL1 and the first magnetic element MG1 is fixed, thus ensuring that the electromagnetic driving force generated by the first driving assembly DA1 remains fixed. Furthermore, based on the configuration of the first coil CL1, the first magnetic element MG1 and the first movable element 208, the aperture size of the first optical element driving mechanism 200 can be continuously changed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a first optical element driving mechanism, comprising:
a first fixed assembly, comprising a first frame;
a first movable assembly, configured to be connected to at least two first optical elements, wherein the first movable assembly is movable relative to the first fixed assembly, and the first movable assembly comprises a first movable element;
a first rolling assembly, disposed between the first frame and the first movable element; and
a first driving assembly, configured to drive the first movable assembly to move relative to the first fixed assembly;
wherein the first driving assembly is configured to drive the first movable element to move around a main axis, and a portion of the first driving assembly is disposed on the first movable element;
wherein the first frame does not overlap with the first movable element when viewed along the main axis;

wherein when viewed along a direction perpendicular to the main axis and toward the main axis, the first rolling assembly is fully exposed from the first movable element;
wherein when viewed along a direction perpendicular to the main axis and away from the main axis, the first rolling assembly is fully exposed from the first frame;
wherein the optical system further comprises a second optical element driving mechanism;
wherein the first optical element driving mechanism is disposed on the second optical element driving mechanism;
wherein the second optical element driving mechanism comprises:
a second fixed assembly;
a second movable assembly, configured to be connected to a second optical element; and
a second driving assembly, configured to drive the second movable assembly and the second optical element to move relative to the second fixed assembly;
wherein the second fixed assembly comprises a casing;
wherein the second optical element driving mechanism further comprises an anti-reflection element disposed on a top surface of the casing;
wherein the anti-reflection element is made of a plastic material;
wherein the casing is made of a metal material;
wherein the anti-reflection element has an opening:
wherein the casing has a casing opening;
wherein a pore diameter of the opening is smaller than a pore diameter of the casing opening; and
wherein the anti-reflection element completely covers the top surface of the casing.

2. The optical system as claimed in claim 1, wherein the first fixed assembly comprises an outer shielding member;
wherein the outer shielding member is affixed to the first frame; and
the first frame is located between the outer shielding member and the first base.

3. The optical system as claimed in claim 2, wherein the first movable element is disposed in the first frame;
the first movable element is rotatable around the main axis relative to the first frame;
the first rolling assembly is disposed between the first movable element and the first base;
the first rolling assembly comprises at least three first rolling elements;
the first movable element rotates around the main axis relative to the first base and the first frame by the first rolling elements;
the first frame has at least three accommodating grooves;
the first movable element has at least three grooves, respectively corresponding to the at least three accommodating grooves;
the first base has at least three grooves, respectively corresponding to the at least three grooves of the first movable element; and
the first rolling element is disposed in the corresponding accommodating groove, the corresponding groove of the first base and the corresponding groove of the first movable element.

4. The optical system as claimed in claim 3, wherein when viewed along the main axis, each of the accommodating grooves has two side surfaces and a connecting surface;

the connecting surface is connected between the two side surfaces;

the connecting surface is neither parallel nor perpendicular to the two side surfaces;

a minimum distance between the two side surfaces is less than a diameter of the first rolling element;

one of the three first rolling elements is configured to be in contact with the two side surfaces of the corresponding accommodating groove instead of being in contact with the corresponding connecting surface; and the other two of the three first rolling elements are configured to be in contact with the connecting surface of the corresponding accommodating groove.

5. The optical system as claimed in claim 4, wherein the at least two first optical elements are movably connected to the first movable element;

when the first movable element rotates around the main axis, the at least two first optical elements move relative to the first fixed assembly and the first movable assembly, so as to adjust the amount of external light entering the first optical element driving mechanism; and when viewed along the main axis, the outer shielding member has a ring structure and a first outer opening.

6. The optical system as claimed in claim 5, wherein there are at least two first guiding grooves formed on the outer shielding member;

each of a part of the at least two first optical elements has a first upper protruding pillar and a first lower protruding pillar formed respectively on opposite surfaces of the corresponding first optical element;

each of the other part of the at least two first optical elements has a second upper protruding pillar and a second lower protruding pillar formed respectively on opposite surfaces of the corresponding first optical element;

the first upper protruding pillar and the second upper protruding pillar extend along the main axis toward the outer shielding member;

the first lower protruding pillar and the second lower protruding pillar extend along the main axis toward the first base;

when viewed along the main axis, the first upper protruding pillar does not overlap the first lower protruding pillar; and when viewed along the main axis, the second upper protruding pillar does not overlap the second lower protruding pillar.

7. The optical system as claimed in claim 6, wherein the first lower protruding pillar and the second lower protruding pillar are configured to be inserted into the first movable element;

each of the at least two first guiding grooves is configured to accommodate the corresponding first upper protruding pillar and the second upper protruding pillar;

when the first movable element rotates around the main axis, a part of the at least two first optical elements rotates around the first lower protruding pillar, and the first upper protruding pillar is configured to move along the corresponding first guiding groove; and when the first movable element rotates around the main axis, the other part of the at least two first optical elements rotates around the second lower protruding pillar, and the second upper protruding pillar is configured to move along the corresponding first guiding groove.

8. The optical system as claimed in claim 7, wherein each of the at least two first optical elements has a plate-shaped structure;

the main axis is perpendicular to an extending direction of the plate-shaped structure;

when viewed in a direction perpendicular to the main axis, a distance between a part of the at least two first optical elements and the first base in the main axis is different from a distance between the other part of the at least two first optical elements and the first base in the main axis; and when viewed in a direction perpendicular to the main axis, a length of the first upper protruding pillar is different from a length of the second upper protruding pillar.

9. The optical system as claimed in claim 8, wherein when viewed in a direction perpendicular to the main axis, the length of the first upper protruding pillar is less than the length of the second upper protruding pillar;

when viewed in a direction perpendicular to the main axis, a length of the first lower protruding pillar is different from a length of the second lower protruding pillar; and when viewed in a direction perpendicular to the main axis, the length of the first lower protruding pillar is greater than the length of the second lower protruding pillar.

10. The optical system as claimed in claim 9, wherein the second fixed assembly further comprises a second base;

wherein the casing is affixed to the second base to form an accommodation space; and the accommodation space is configured to accommodate the second movable assembly and the second driving assembly.

11. The optical system as claimed in claim 10, wherein the casing surrounds a portion of the first optical element driving mechanism;

when viewed in a direction perpendicular to the main axis, a portion of the first optical element driving mechanism protrudes from the casing;

the second movable assembly comprises a holder and a second frame;

at least a portion of the first optical element driving mechanism is disposed on the second optical element;

the second frame surrounds a portion of the first optical element driving mechanism; and when viewed in a direction perpendicular to the main axis, the second frame overlaps at least a portion of the first frame.

12. The optical system as claimed in claim 11, wherein the first movable element comprises a first body and a radial extending portion;

the first body has a ring structure;

the radial extending portion radially extends from the first body;

the radial extending portion has a receiving groove; and the first driving assembly comprises a first magnetic element disposed in the receiving groove.

13. The optical system as claimed in claim 12, wherein when viewed along the main axis, the radial extending portion has an arc-shaped structure;

when viewed along the main axis, the first magnetic element has an arc-shaped structure;

a shape of the arc-shaped structure of the first magnetic element corresponds to a shape of the arc-shaped structure of the radial extending portion;

when viewed along a first axis, the first magnetic element is exposed from the casing;

the first axis is perpendicular to the main axis; and when viewed in a direction perpendicular to the main axis, the first magnetic element overlaps the top surface of the casing.

14. The optical system as claimed in claim 13, wherein the second optical element driving mechanism further comprises a circuit assembly electrically connected to the first driving assembly and the second driving assembly;

the circuit assembly comprises a substrate, a sharing element, a first circuit element and a second circuit element;

the sharing element, the first circuit element and the second circuit element are integrally formed as one piece;

the substrate is disposed on the second base;

the sharing element, the first circuit element and the second circuit element each has a long strip-shaped structure;

the sharing element extends along a second axis from the substrate;

the second axis is perpendicular to the first axis; and the second axis is parallel to the main axis.

15. The optical system as claimed in claim 14, wherein the first circuit element is configured to be electrically connected to the first driving assembly;

when viewed along the first axis, the first circuit element extends in a first direction from the sharing element;

the second circuit element is configured to be electrically connected to a second position sensing element;

when viewed along the first axis, the second circuit element extends in a second direction from the sharing element; and the first direction is the opposite of the second direction.

16. The optical system as claimed in claim 15, wherein the first circuit element comprises a first extending portion, a second extending portion, a third extending portion and a first contact portion;

the first extending portion is connected between the sharing element and the second extending portion;

the second extending portion is connected between the first extending portion and the third extending portion;

the third extending portion is connected to the first contact portion;

when viewed along the main axis, the first extending portion and the third extending portion extend along a third axis; and the third axis is perpendicular to the second axis and the first axis.

17. The optical system as claimed in claim 16, wherein when viewed along the main axis, the second extending portion and the first contact portion extend along the first axis;

when viewed along the main axis, the first extending portion, the second extending portion, the third extending portion and the first contact portion contact the second frame;

the second frame has a front side wall and a concave structure;

the concave structure is concaved from the front side wall along the third axis; and the third extending portion and the first contact portion are disposed in the concave structure.

18. The optical system as claimed in claim 17, wherein the first driving assembly further comprises a first coil;

the first coil is fixedly disposed on the first contact portion;

the second frame further has a positioning structure;

the positioning structure has a long strip-shaped structure that extends along the second axis; and the first contact portion is fixedly connected to the positioning structure.

19. The optical system as claimed in claim 18, wherein when viewed along the third axis, the first coil is located in the positioning structure;

when viewed along the third axis, the first contact portion completely covers the first coil; and when viewed along the third axis, the first contact portion, the positioning structure and the first coil extend beyond the second optical element driving mechanism.

20. An optical system, comprising:

a first optical element driving mechanism, comprising:

a first fixed assembly, comprising a first frame;

a first movable assembly, configured to be connected to at least two first optical elements, wherein the first movable assembly is movable relative to the first fixed assembly, and the first movable assembly comprises a first movable element;

a first rolling assembly, disposed between the first frame and the first movable element; and a first driving assembly, configured to drive the first movable assembly to move relative to the first fixed assembly;

wherein the first driving assembly is configured to drive the first movable element to move around a main axis, and a portion of the first driving assembly is disposed on the first movable element;

wherein the first frame does not overlap with the first movable element when viewed along the main axis;

wherein at least a portion of the first rolling assembly does not overlap with the first frame and the first movable element when viewed along the main axis;

wherein the optical system further comprises a second optical element driving mechanism;

wherein the first optical element driving mechanism is disposed on the second optical element driving mechanism;

wherein the second optical element driving mechanism comprises:

a second fixed assembly;

a second movable assembly, configured to be connected to a second optical element; and a second driving assembly, configured to drive the second movable assembly and the second optical element to move relative to the second fixed assembly;

wherein the second fixed assembly comprises a casing;

wherein the second optical element driving mechanism further comprises an anti-reflection element disposed on a top surface of the casing;

wherein the anti-reflection element is made of a plastic material;

wherein the casing is made of a metal material;

wherein the anti-reflection element has an opening;

wherein the casing has a casing opening;

wherein a pore diameter of the opening is smaller than a pore diameter of the casing opening; and wherein the anti-reflection element completely covers the top surface of the casing.

21. An optical system, comprising:

a first optical element driving mechanism, comprising:

a first fixed assembly, comprising a first frame, wherein the first frame has at least three accommodating grooves;

a first movable assembly, configured to be connected to at least two first optical elements, wherein the first movable assembly is movable relative to the first fixed assembly, and the first movable assembly comprises a first movable element, and the first movable element has at least three grooves, respectively corresponding to the at least three accommodating grooves;

a first rolling assembly, comprising at least three first rolling elements, the first rolling element is disposed in the accommodating groove and the groove of the first movable element; and a first driving assembly, configured to drive the first movable assembly to move relative to the first fixed assembly;

wherein the first driving assembly is configured to drive the first movable element to move around a main axis, and a portion of the first driving assembly is disposed on the first movable element;

wherein the first frame does not overlap with the first movable element when viewed along the main axis;

wherein the at least three accommodating grooves and the at least three grooves of the first movable element do not overlap when viewed along the main axis;

wherein the optical system further comprises a second optical element driving mechanism;

wherein the first optical element driving mechanism is disposed on the second optical element driving mechanism;

wherein the second optical element driving mechanism comprises:

a second fixed assembly;

a second movable assembly, configured to be connected to a second optical element; and a second driving assembly, configured to drive the second movable assembly and the second optical element to move relative to the second fixed assembly;

wherein the second fixed assembly comprises a casing;

wherein the second optical element driving mechanism further comprises an anti-reflection element disposed on a top surface of the casing;

wherein the anti-reflection element is made of a plastic material;

wherein the casing is made of a metal material;

wherein the anti-reflection element has an opening;

wherein the casing has a casing opening;

wherein a pore diameter of the opening is smaller than a pore diameter of the casing opening; and wherein the anti-reflection element completely covers the top surface of the casing.

* * * * *